(12) United States Patent
Hiraoka et al.

(10) Patent No.: US 8,696,101 B2
(45) Date of Patent: Apr. 15, 2014

(54) PHOTOPOLYMERIZABLE INKJET BLACK INK, AND INK CARTRIDGE, INKJET PRINTER AND PRINTED MATERIAL USING THE INK, AND METHOD OF PREPARING THE INK

(75) Inventors: Takao Hiraoka, Kanagawa (JP); Tomoko Hasegawa, Ibaraki (JP); Tsutomu Maekawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 238 days.

(21) Appl. No.: 13/364,778

(22) Filed: Feb. 2, 2012

(65) Prior Publication Data

US 2012/0200648 A1 Aug. 9, 2012

(30) Foreign Application Priority Data

Feb. 7, 2011 (JP) ................. 2011-024450

(51) Int. Cl.
*G01D 11/00* (2006.01)
*C09D 11/00* (2006.01)

(52) U.S. Cl.
USPC ....... 347/100; 106/31.29; 106/31.61

(58) Field of Classification Search
USPC ........... 347/100; 106/31.29, 31.61, 31.62
See application file for complete search history.

(56) References Cited

U.S. PATENT DOCUMENTS

| 6,106,602 | A | 8/2000 | Ouchi et al. | |
|---|---|---|---|---|
| 2008/0103254 | A1* | 5/2008 | Asada | 524/832 |
| 2011/0223391 | A1* | 9/2011 | Nishimura et al. | 428/195.1 |

FOREIGN PATENT DOCUMENTS

| CN | 101550295 A | 10/2009 |
|---|---|---|
| JP | 10-7968 | 1/1998 |
| JP | 10-237367 | 9/1998 |
| JP | 10-237368 | 9/1998 |
| JP | 10-251589 | 9/1998 |
| JP | 10-330663 | 12/1998 |
| JP | 2002-20672 | 1/2002 |
| JP | 2002-38072 | 2/2002 |
| JP | 2003-55571 | 2/2003 |
| JP | 3446213 | 7/2003 |
| JP | 2005-344070 | 12/2005 |
| JP | 2006-45511 | 2/2006 |
| JP | 2006-257305 | 9/2006 |
| JP | 2007-254700 | 10/2007 |
| JP | 2008-248008 | 10/2008 |
| JP | 2010-516860 | 5/2010 |
| WO | WO 99/67337 A1 | 12/1999 |
| WO | WO 2007/126103 A1 | 11/2007 |
| WO | WO 2008/091653 A2 | 7/2008 |
| WO | WO 2008/091653 A3 | 7/2008 |

OTHER PUBLICATIONS

Chinese Office Action issued Sep. 30, 2013, in China Patent Application No. 201210023792.5.

* cited by examiner

*Primary Examiner* — Jannelle M Lebron
(74) *Attorney, Agent, or Firm* — Oblon, Spivak, McClelland, Maier & Neustadt, L.L.P.

(57) ABSTRACT

A photopolymerizable inkjet black ink having a viscosity not greater than 20 mPa·s at 60° C., including a clear ink having a viscosity not greater than 15 mPa·s at 60° C. including a photopolymerizable monomer having a Stimulation Index (SI value) less than 3 when subjected to a skin sensitization test (LLNA method) and a polymerization initiator without including carbon black and insolubles; and a carbon black in an amount not greater than 7% by weight.

7 Claims, 1 Drawing Sheet

US 8,696,101 B2

PHOTOPOLYMERIZABLE INKJET BLACK INK, AND INK CARTRIDGE, INKJET PRINTER AND PRINTED MATERIAL USING THE INK, AND METHOD OF PREPARING THE INK

CROSS-REFERENCE TO RELATED APPLICATIONS

This patent application is based on and claims priority pursuant to 35 U.S.C. §119 to Japanese Patent Application No. 2011-024450, filed on Feb. 7, 2011, in the Japanese Patent Office, the entire disclosure of which is hereby incorporated herein by reference.

FIELD OF THE INVENTION

The present invention relates to a photopolymerizable inkjet black ink, and an ink cartridge, an inkjet printer and a printed material using the ink, and a method of preparing the ink.

BACKGROUND OF THE INVENTION

Photopolymerizable monomers for use in the photopolymerizable inkjet ink include (meth)acrylic acid ester compounds, acrylamide compounds, oxetane compounds, epoxy compounds, etc., and the (meth)acrylic acid ester compounds and the acrylamide compounds are preferably used because of being widely available in significant quantities, and inexpensively and easily obtainable.

However, many of the (meth)acrylic acid ester compounds and the acrylamide compounds are poisonous. Some of them have low oral toxicity and skin irritancy, but those having low viscosity used for the inkjet ink are not safe materials in skin sensitization, occasionally causing contact allergy.

Meanwhile, methods of adsorbing a polymeric dispersant for well dispersing a pigment such as carbon black in an inkjet ink are known. In addition, many references such as Japanese published unexamined applications Nos. 10-7968, 10-237367 and 10-251589 disclose specifying a molecular weight of the polymeric dispersant for better dispersibility are known, but lowering viscosity is not mentioned at all therein. As Einstein methods show, the viscosity of a dispersion depends on a volume fraction of a pigment, and the thickness of an adsorption layer needs to be as thin as possible to prevent the volume of the pigment from increasing due to adsorption of the polymeric dispersant. Even though the dispersant has a low molecular weight, a thick adsorption layer is occasionally formed unless adsorption of the polymeric dispersant is controlled, failing in obtaining low viscosity.

Japanese published unexamined application No. 10-237368 discloses a method of decreasing increase of viscosity when blending a pigment. However, this needs a process of centrifugally removing an extra polymeric dispersant, resulting in a complicated process of preparing an ink.

Because of these reasons, a need exists for a low-viscosity photopolymerizable inkjet black ink using a photopolymerizable monomer safe in skin sensitization.

SUMMARY OF THE INVENTION

Accordingly, an object of the present invention is to provide a low-viscosity photopolymerizable inkjet black ink using a photopolymerizable monomer safe in skin sensitization.

Another object of the present invention is to provide an ink cartridge using the ink.

A further object of the present invention is to provide an inkjet printer using the ink.

Another object of the present invention is to provide a printed material using the ink.

A further object of the present invention is to provide a method of preparing the ink.

These objects and other objects of the present invention, either individually or collectively, have been satisfied by the discovery of a photopolymerizable inkjet black ink having a viscosity not greater than 20 mPa·s at 60° C., comprising:

a clear ink having a viscosity not greater than 15 mPa·s at 60° C., comprising a photopolymerizable monomer having a Stimulation Index (SI value) less than 3 when subjected to a skin sensitization test (LLNA method) and a polymerization initiator without including carbon black and insolubles; and a carbon black in an amount not greater than 7% by weight.

These and other objects, features and advantages of the present invention will become apparent upon consideration of the following description of the preferred embodiments of the present invention taken in conjunction with the accompanying drawings.

DETAILED DESCRIPTION OF THE INVENTION

Figure 1:
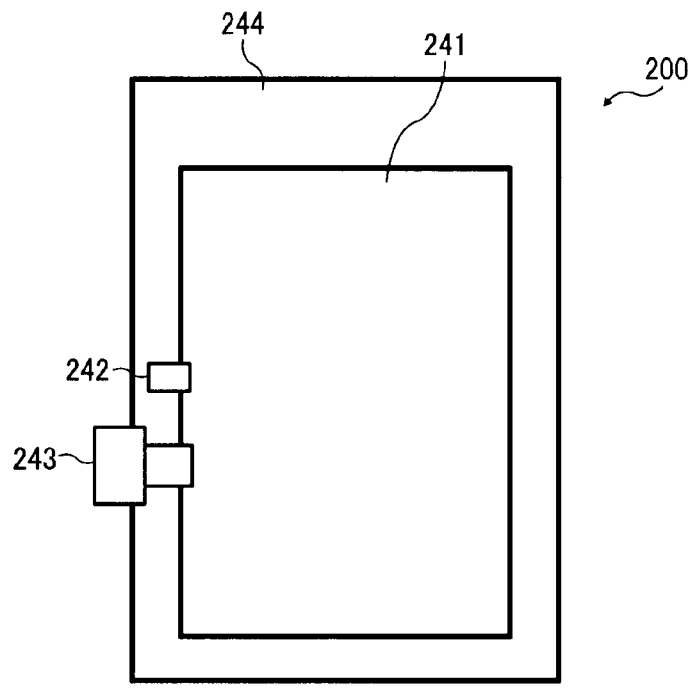
FIG. 1 is a schematic view illustrating an embodiment of the ink cartridge including a case (exterior) of the present invention.

The present invention provides a a low-viscosity photopolymerizable inkjet black ink using a photopolymerizable monomer safe in skin sensitization.

More particularly, the present invention relates to a photopolymerizable inkjet black ink having a viscosity not greater than 20 mPa·s at 60° C., comprising:

a clear ink having a viscosity not greater than 15 mPa·s at 60° C., comprising a photopolymerizable monomer having a Stimulation Index (SI value) less than 3 when subjected to a skin sensitization test (LLNA method) and a polymerization initiator without including carbon black and insolubles; and a carbon black in an amount not greater than 7% by weight.

The present inventors found some (meth)acrylic acid ester compounds and acrylamide compounds usable as a photopolymerizable monomer having a Stimulation Index (SI value) less than 3 when subjected to a skin sensitization test (LLNA method). However, both of them have high viscosities and need to be designed to prevent their viscosities from increasing when mixed as an ink material. In addition, a polymerization initiator needed for light curing of the photopolymerizable monomer increases the ink viscosity, which should be considered as well.

The LLNA method is a skin sensitization test specified as OECD test guide line 429, and as shown on page 55 in "Functional Materials" Vol. 25, No. 9 published in September, 2005, the skin sensitization is determined to have no problem when Stimulation Index (SI value) showing a degree of the skin sensitization is less than 3.

Further, material evaluated in MSDS (Material Safety Data Sheet) to be negative in skin sensitization or have no skin sensitization, obviously satisfying the SI value are included in the present invention.

When a pigment is mixed in an ink, the viscosity thereof increases. Therefore, something should be considered for preventing the viscosity from increasing when a carbon black pigment is mixed therein.

A solvent may be mixed to decrease the viscosity, but is preferably not used because of having environmental and inkjet discharge stability problems in consideration of its volatility.

Including the photopolymerizable monomer, the polymerization initiator, but including neither carbon black nor insolubles such as wax emulsion, an ink material (hereinafter referred to as a clear ink) has a viscosity not greater than 15 mPa·s at 60° C. The resultant inkjet black ink (hereinafter referred to as an ink) after mixed with carbon black has a viscosity as low as not greater than 20 mPa·s at 60° C. The maximum viscosity of inks usable for marketed inkjet heads is 20 mPa·s at 60° C., and which needs satisfying.

In the clear ink, the photopolymerizable monomer works as a solvent for the polymerization initiator. Namely, polymerization initiator is dissolved in the photopolymerizable monomer.

The wax emulsion is an additive for strengthening the resultant coated layer after polymerization, and when included too much relative to the carbon black, the viscosity may not be satisfied.

Specific examples of the photopolymerizable monomer having an SI value less than 3 include polyethyleneglycoldimethacrylate having the formula (1),

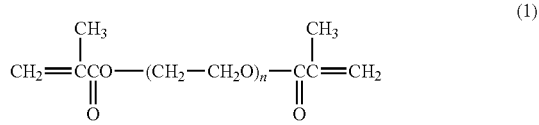

(1)

wherein n represents 9 or 14, γ-butyrolactonemethacrylate, trimethylolpropanetrimethacrylate, tricyclodecanedimethanoldimethacrylate, caprolactone-modified dipentaerythritolhexaacrylate, caprolactone-modified neopentylglycolhydroxypivalate ester, polyethoxylated tetramethylolmethanetetraacrylate, ethyleneoxide-modified bisphenol A diacrylate, hydroxyethylacrylamide, etc.

The ink includes carbon black in an amount not greater than 7% by weight. This is because the resultant image density is equivalent to that of the marketed inkjet black ink producing images having the highest image density. The minimum quantity of the carbon black is difficult to specify because the image density depends on printers. Particularly, there have been some cases a very small quantity of carbon black is mixed recently to produce pale color, and may be properly determined according to applications.

The ink of the present invention can be discharged by marketed inkjet heads and produces images having image density equivalent to that of marketed inkjet black inks.

In the present invention, a polymeric dispersant is preliminarily included in a carbon black dispersion to prepare an ink having a specific low or lower viscosity, and in which the carbon black is well dispersed.

Mixing the same photopolymerizable monomer as that used in the clear ink, carbon black and a dispersant to prepare a carbon black dispersion; and diluting the carbon black dispersion with the clear ink to prepare the ink of the present invention. The clear ink works as a dispersion medium of the carbon black.

In order to disperse carbon black in the clear ink, the polymeric dispersant is effectively adsorbed on the surface of the carbon black. It is necessary to form an adsorption layer having not less than a specific thickness to obtain good dispersibility. When a thick adsorption layer is formed on carbon black having a small particle diameter, the volume of the carbon black largely increases, resulting in larger viscosity.

Therefore, when a relationship $2d+h \leq 1.1h$, in which h is an average primary particle diameter of carbon black and d is a thickness of an adsorption layer formed if the carbon black on which a polymeric dispersant is adsorbed, is satisfied, the present invention can easily be prepared. In addition, the volume increase of the carbon black when adsorbing the dispersant can be prevented, and the resultant ink has a viscosity a not greater than 20 mPa·s at 60° C. dischargeable by marketed inkjet heads.

$2d+h \leq 1.1h$ equals $20d \leq h$, and when a carbon black having an primary particle diameter not less than 70 nm, an adsorption layer having a thickness not less than 3.5 nm is formed. When the adsorption layer has a thickness not less than 3.5 nm, the carbon black is well dispersed.

The average primary particle diameter of the carbon black can be measured by capillary viscosity measurement methods, dynamic light scattering methods or measuring or observing with an electron microscope.

As the polymeric dispersants, homopolymers or copolymers formed of one or more monomers capable of forming polymers such as polyester polymers, polyvinyl polymers, polyacrylic acid ester polymers and polyurethane polymers, or these polymers having functional groups such as amino groups, carboxylic groups, phosphoric groups, sulfonic groups or their salts can be used. The polymeric dispersants preferably have a molecular weight of from a few thousand to hundreds of thousands. Marketed products include Ajisper from Ajinomoto Fine-Techno Co., Inc., SOLSPERSE from The Lubrizol Corporation, DISPARLON from Kusumoto Chemicals, Ltd., etc.

The ink of the present invention may include additives for accelerating polymerizations such as sensitizers and polymerization accelerators, polymerization inhibitors for preservation stability, surfactants for assuring image quality, wax emulsions for assuring coated layer strength after polymerization, etc.

Specific examples of the sensitizers include thioxanthone compounds such as diethylthioxantone, isopropylthioxantone, 2-chloro-thioxanthone and 1-chloro-4-propylthioxantone; and benzophenone compounds.

Specific examples of the polymerization accelerators include tertiary amine compounds such as ethyl p-dimethylaminobenzoate, ethyl hexyl p-dimethylaminobenzoate, benzoic acid-2-dimethylaminoethyl and butoxy ethyl p-dimethylaminobenzoate.

Specific examples of the polymerization inhibitors include phenol quinone compounds such as hydroquinone, methoquinone, methyl hydroquinone, t-butyl hydroquinone, di-t-butyl hydroquinone, phenothiazine and 4-methyl-1-naphthol; and amine compounds.

Specific examples of the surfactants include fluoroalkyl surfactants, dimethylsiloxane surfactants, alkyl surfactants, etc.

Specific examples of the wax emulsions include polyethylene waxes, carnauba waxes, fatty acid ester compounds, fluorine or silicon-containing waxes, etc.

The ink of the present invention can be photopolymerized with light irradiation not greater than 1,000 mJ/cm$^2$.

Further, printed materials printed with the ink of the present invention has high safety even when an unpolymerized monomer due to process problems is left thereon because of its low skin sensitization.

The ink of the present invention is preferably contained in a cartridge. Thus, it is necessary to directly contact the ink, and which prevents hands and clothes from being contaminated, and filling the ink can be simplified.

The ink cartridge contains the ink in its container and has other members when necessary. The container is not particularly limited, and can select a shape, structure, size and materials, etc. in accordance with the purpose. For example, ink bags formed of aluminum-laminated films, resin films, etc. are preferably used.

An embodiment of the ink cartridge (200) is explained, referring to FIG. 1.

After an ink is filled in an ink bag (241) from an ink filling opening (242) and the air therein is exhausted, the ink filling opening (242) is heat-sealed to be closed. When used, a needle of the apparatus is inserted an ink discharge opening (243) formed of a rubber member to provide the ink to the apparatus. The ink bag (241) is formed of a wrapping member such as aluminum-laminated films having no air permeability. The ink bag (241) is typically contained in a plastic cartridge case (244) as FIG. 1 shows, and is detachably installed in various inkjet recorders.

The ink cartridge (200) contains an ink and can detachably be installed in various inkjet recorders, and it is preferable that the cartridge (200) is detachably be installed in the inkjet recorder of the present invention mentioned later.

The inkjet printer of the present invention includes the ink cartridge and a head discharging an ink.

Printing (discharging) methods include continuous spraying methods and on-demand methods. The on-demand methods include piezo methods, thermal methods, electrostatic methods, etc.

Figure 2:
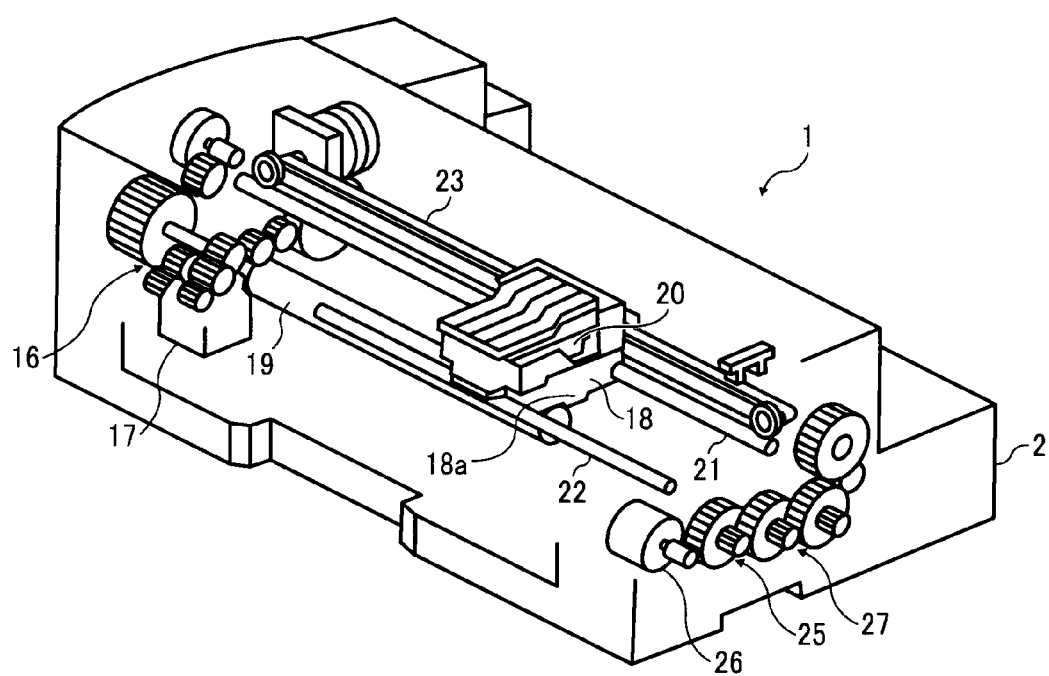
FIG. 2 is a schematic view illustrating an embodiment of the inkjet printer of the present invention.

An embodiment of the inkjet printer of the present invention is explained, referring to FIG. 2.

In FIG. 2, an ink cartridge 20 containing the ink for inkjet recording of the present invention is contained in a carriage 18. Plural ink cartridges 20 are contained, but do not need to be plural. The ink for inkjet recording is fed to a droplet discharge head 18a installed in the carriage 18 from the ink cartridge 20. In FIG. 2, a discharge nozzle surface faces downward and is not seen, but the ink for inkjet recording is discharged therefrom.

The droplet discharge head 18a installed in the carriage 18 is moved by a timing belt 23 driven by a main scanning motor 26 while guided by guide shafts 21 and 22.

Meanwhile, a specific coated paper (an image substrate) is placed facing the droplet discharge head 18a by a platen 19. In FIG. 2, numeral 1 is an inkjet printer, 2 is a chassis, 16 is a gear mechanism, 17 is a sub-scanning motor, and 25 and 27 are gear mechanisms.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Preparation of Clear Ink

Clear inks A to G in Tables 1 to 1-1 were prepared by mixing photopolymerizable monomers and polymerization initiators therein. Their viscosities at 60° C. are shown therein. Some monomers having positive skin sensitization such as clear ink A have low viscosities, but a few monomers having negative skin sensitization have low viscosities.

However, clear inks B to K in Tables 1 to 1-1 having proper monomer blending compositions have viscosities not greater than 15 mPa·s at 60° C. The viscosities were measured by a cone-plate rotating viscometer from Toki Sangyo Co., Ltd, setting the temperature of a constant-temperature cyclic water at 60° C.

TABLE 1

| | | | A | B | C | D | E |
|---|---|---|---|---|---|---|---|
| Photopolymerizable Monomer | Positive skin sensitization | Neopentylglycol diacrylate | 100 | | | | |
| | Negative skin sensitization or SI value less than 3 | Polyethyleneglycol#400 dimethacrylate | | | 5 | | |
| | | Polyethyleneglycol#600 dimethacrylate | | | | 5 | |
| | | γ-butyrolactone methacrylate | | | | | 5 |
| | | Trimethylolpropane trimethacrylate | | 100 | 95 | 95 | 95 |
| | | Tricyclodecane dimethanol dimethacrylate | | | | | |
| | | Caprolactone-modified dipentaerythritol hexaacrylate | | | | | |
| | | Caprolactone-modified neopentylglycol hydroxypivalate ester | | | | | |
| | | Polyethoxylated tetramethylolmethane tetraacrylate | | | | | |
| | | Ethyleneoxide-modified bisphenol A diacrylate | | | | | |
| | | Hydroxyethylacrylamide | | | | | |
| Polymerization initiator | | 2-methyl-1-[4-(methylthio)phenyl-2-morpholinopropane-1-on | 20 | 20 | 20 | 20 | 20 |
| Viscosity at 60° C. (mPa · s) | | | 8 | 14 | 13 | 14 | 13 |

TABLE 1-1

|  |  |  | F | G | H | I | J | K |
|---|---|---|---|---|---|---|---|---|
| Photopolymerizable Monomer | Positive skin sensitization | Neopentylglycol diacrylate |  |  |  |  |  |  |
|  | Negative, no skin sensitization or SI value less than 3 | Polyethyleneglycol#400 dimethacrylate |  |  |  |  |  |  |
|  |  | Polyethyleneglycol#600 dimethacrylate |  |  |  |  |  |  |
|  |  | γ-butyrolactone methacrylate |  |  |  |  |  |  |
|  |  | Trimethylolpropane trimethacrylate | 95 | 95 | 95 | 95 | 95 | 95 |
|  |  | Tricyclodecane dimethanol dimethacrylate | 5 |  |  |  |  |  |
|  |  | Caprolactone-modified dipentaerythritol hexaacrylate |  | 5 |  |  |  |  |
|  |  | Caprolactone-modified neopentylglycol hydroxypivalate ester |  |  | 5 |  |  |  |
|  |  | Polyethoxylated tetramethylolmethane tetraacrylate |  |  |  | 5 |  |  |
|  |  | Ethyleneoxide-modified bisphenol A diacrylate |  |  |  |  | 5 |  |
|  |  | Hydroxyethylacrylamide |  |  |  |  |  | 5 |
| Polymerization initiator |  | 2-methyl-1-[4-(methylthio)phenyl-2-morpholinopropane-1-on | 20 | 20 | 20 | 20 | 20 | 20 |
| Viscosity at 60° C. (mPa · s) |  |  | 15 | 15 | 15 | 15 | 15 | 15 |

Each of the photopolymerizable monomer used in the clear inks B to K has the following SI values.

| | |
|---|---|
| Polyethyleneglycol#400 dimethacrylate | 1.3 |
| Polyethyleneglycol#600 dimethacrylate | 1.6 |
| γ-butyrolactone methacrylate | 2.1 |
| Trimethylolpropanetrimethacrylate | 1.9 |
| Tricyclodecanedimethanoldimethacrylate | 1.3 |
| Caprolactone-modified dipentaerythritolhexaacrylate | Negative skin sensitization (from MSDS) |
| Caprolactone-modified neopentylglycolhydroxypivalate ester | 0.9 |
| Polyethoxylated tetramethylolmethanetetraacrylate | 1.7 |
| Ethyleneoxide-modified bisphenol A diacrylate | 1.2 |
| Hydroxyethylacrylamide | No skin sensitization (from MSDS) |

Examples 1 to 10, Comparative Examples 1 to 20 and Reference Examples 1 to 3

The same amount of the photopolymerizable monomer used in each of the clear ink A to K, 2% by weight of a polyester dispersant including a basic functional group (a polystyrene-converted weight average molecular weight 3,700), and 15% by weight of carbon blacks having average primary particle diameters of 29 nm, 55 nm and 76 nm were mixed to prepare dispersions.

The clear inks A to K were mixed in the relevant dispersions such that each of the carbon blacks in the resultant ink has a content of 7% by weight to prepare inks of Examples 1 to 10, Comparative Examples 1 to 20 and Reference Examples 1 to 3 in Tables 2 to 12.

All of these inks could be polymerized with light irradiation not greater than 1,000 mJ/cm$^2$ and could produce images having image density equivalent to those produced by the black ink for Ipsio GX5000 from Ricoh Company, Ltd.

The average primary particle diameter of the carbon black, the thickness of the adsorption layer of the dispersant, (2 d+h)/h, the content of the carbon black, and the viscosity of the ink at 60° C. are shown in Tables 2 to 12. The average primary particle diameter was measured by electron microscope JEM-2010 from JEOL Ltd.

The thickness of the adsorption layer of the dispersant was determined by the following formula.

Thickness=(φ1−φ2)/pigment surface area wherein φ1 is a volume fraction of a pigment (including the adsorption layer) determined by Einstein methods (ηr=1+2.5φ wherein ηr is a relative viscosity and φ is a volume fraction of the pigment), and φ2 is a volume fraction of a known pigment, which is previously weighed.

The viscosity of the ink at 60° C. was measured by the same method as that measured the clear ink.

Tables 2 to 12 show when 2 d+h is not greater than 1.1 h, carbon black is mixed in clear ink having a viscosity of 15 mPa·s at 60° C. in an amount of 7% by weight to prepare an inkjet black ink having a viscosity not greater than 20 mPa·s at 60° C.

TABLE 2

| Black ink based on clear ink B | Comparative Example 1 | Comparative Example 2 | Example 1 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |

TABLE 2-continued

| Black ink based on clear ink B | Comparative Example 1 | Comparative Example 2 | Example 1 |
|---|---|---|---|
| Content of carbon black (% by weight) | 7 | 7 | 7 |
| Viscosity at 60° C. (mPa·s) | 25 | 22 | 19 |

TABLE 3

| Black ink based on clear ink C | Comparative Example 3 | Comparative Example 4 | Example 2 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 24 | 21 | 18 |

TABLE 4

| Black ink based on clear ink D | Comparative Example 5 | Comparative Example 6 | Example 3 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 25 | 22 | 19 |

TABLE 5

| Black ink based on clear ink E | Comparative Example 7 | Comparative Example 8 | Example 4 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 24 | 21 | 18 |

TABLE 6

| Black ink based on clear ink F | Comparative Example 9 | Comparative Example 10 | Example 5 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 26 | 22 | 19 |

TABLE 7

| Black ink based on clear ink G | Comparative Example 11 | Comparative Example 12 | Example 6 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 29 | 24 | 20 |

TABLE 8

| Black ink based on clear ink H | Comparative Example 13 | Comparative Example 14 | Example 7 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 27 | 23 | 20 |

TABLE 9

| Black ink based on clear ink I | Comparative Example 15 | Comparative Example 16 | Example 8 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 28 | 23 | 20 |

TABLE 10

| Black ink based on clear ink J | Comparative Example 17 | Comparative Example 18 | Example 9 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 27 | 23 | 20 |

TABLE 11

| Black ink based on clear ink K | Comparative Example 19 | Comparative Example 20 | Example 10 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 26 | 22 | 20 |

TABLE 12

| Black ink based on clear ink A | Reference Example 1 | Reference Example 2 | Reference Example 3 |
|---|---|---|---|
| Average primary particle diameter of carbon black (nm) | 29 | 55 | 76 |
| Thickness of adsorption layer of dispersant | 3 | 3 | 3 |
| (2d + h)/h | 1.21 | 1.11 | 1.08 |
| Content of carbon black (% by weight) | 7 | 7 | 7 |
| Viscosity at 60° C. (mPa·s) | 19 | 16 | 13 |

What is claimed is:

1. A photopolymerizable inkjet black ink having a viscosity not greater than 20 mPa·s at 60° C., comprising:
   a clear ink having a viscosity not greater than 15 mPa·s at 60° C., comprising a photopolymerizable monomer having a Stimulation Index (SI value) less than 3 when subjected to a skin sensitization test (LLNA method) and a polymerization initiator without including carbon black and insolubles; and
   a carbon black in an amount not greater than 7% by weight.

2. The photopolymerizable inkjet black ink of claim 1, wherein the carbon black has an adsorption layer formed of a polymeric dispersant on its surface and the following relationship is satisfied:

$$2d+h \leq 1.1h$$

wherein h represents an average primary particle diameter of the carbon black; and d represents a thickness of the adsorption layer.

3. The photopolymerizable inkjet black ink of claim 1, wherein the photopolymerizable monomer is a compound selected from the group consisting of polyethyleneglycoldimethacrylate having the formula (1):

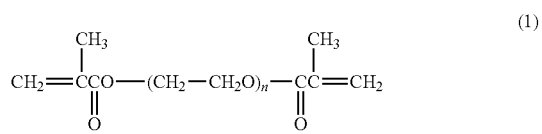

wherein n represents 9 or 14, γ-butyrolactonemethacrylate, trimethylolpropanetrimethacrylate, tricyclodecanedimethanoldimethacrylate, caprolactone-modified dipentaerythritolhexaacrylate, caprolactone-modified neopentylglycolhydroxypivalate ester, polyethoxylated tetramethylolmethanetetraacrylate, ethyleneoxide-modified bisphenol A diacrylate and hydroxyethylacrylamide.

4. An ink cartridge containing the photopolymerizable inkjet black ink of claim 1.

5. An inkjet printer comprising the ink cartridge according to claim 4.

6. A printed material printed with the photopolymerizable inkjet black ink of claim 1.

7. A method of preparing a photopolymerizable inkjet black ink having a viscosity not greater than 20 mPa·s at 60° C., comprising:
   mixing a photopolymerizable monomer having a Stimulation Index (SI value) less than 3 when subjected to a skin sensitization test (LLNA method) with a polymerization initiator without carbon black and insolubles to prepare a clear ink having a viscosity not greater than 15 mPa·s at 60° C.;
   dispersing the photopolymerizable monomer, a carbon black and a dispersant to prepare a dispersion; and
   diluting the dispersion with the clear ink such that the resultant inkjet black ink includes the carbon black in an amount not greater than 7% by weight.

* * * * *